(12) United States Patent
Ito et al.

(10) Patent No.: US 7,710,486 B2
(45) Date of Patent: May 4, 2010

(54) IMAGE SENSING APPARATUS AND METHOD OF CONTROLLING THE SAME

(75) Inventors: Taeko Ito, Kanagawa (JP); Emi Hitosuga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1406 days.

(21) Appl. No.: 10/665,953

(22) Filed: Sep. 19, 2003

(65) Prior Publication Data

US 2004/0056967 A1    Mar. 25, 2004

(30) Foreign Application Priority Data

Sep. 20, 2002  (JP) ............................. 2002-275833
Dec. 5, 2002   (JP) ............................. 2002-353827

(51) Int. Cl.
    *H04N 5/222* (2006.01)
    *H04N 5/76* (2006.01)

(52) U.S. Cl. ............................. 348/333.02; 348/231.3; 348/333.11

(58) Field of Classification Search .............. 348/231.3, 348/589, 231.6, 333.02, 333.11, 333.12
    See application file for complete search history.

(56) References Cited

U.S. PATENT DOCUMENTS

| | | | | |
|---|---|---|---|---|
| 5,499,294 A | * | 3/1996 | Friedman ..................... | 713/179 |
| 6,005,936 A | * | 12/1999 | Shimizu et al. ............. | 713/176 |
| 6,097,431 A | * | 8/2000 | Anderson et al. ......... | 348/231.7 |
| 6,137,534 A | * | 10/2000 | Anderson ................. | 348/222.1 |
| 6,269,446 B1 | | 7/2001 | Schumacher et al. | |
| 6,718,118 B1 | * | 4/2004 | Oguro .......................... | 386/46 |
| 6,738,075 B1 | * | 5/2004 | Torres et al. ................. | 715/723 |
| 6,765,612 B1 | * | 7/2004 | Anderson et al. ........ | 348/231.2 |
| 6,829,367 B1 | * | 12/2004 | Toyokawa et al. ........... | 382/100 |
| 6,937,281 B1 | * | 8/2005 | Ogawa .................. | 348/333.12 |
| 6,963,363 B1 | * | 11/2005 | Ohmura .................... | 348/231.3 |
| 6,968,058 B1 | | 11/2005 | Kondoh et al. .............. | 380/200 |
| 7,010,144 B1 | * | 3/2006 | Davis et al. ................. | 382/100 |
| 7,095,873 B2 | * | 8/2006 | Venkatesan et al. ......... | 382/100 |
| 7,187,406 B2 | * | 3/2007 | Taniguchi et al. ........ | 348/231.3 |
| 7,301,562 B2 | * | 11/2007 | Belz et al. .............. | 348/207.99 |

(Continued)

FOREIGN PATENT DOCUMENTS

EP    0984615    3/2000

(Continued)

OTHER PUBLICATIONS

Patent Abstracts of Japan English Abstract of JP 11-308564.

(Continued)

*Primary Examiner*—Sinh Tran
*Assistant Examiner*—Daniel M Pasiewicz
(74) *Attorney, Agent, or Firm*—Cowan, Liebowitz & Latman, P.C.

(57) ABSTRACT

An image sensing apparatus, an image sensing unit, an authentication data generating unit, a storing unit and a display unit. The image sensing unit generates image data. The authentication data generating unit generates authentication data used to authenticate whether the image data is altered. The storing unit stores an image file including the image data and the authentication data in a removable memory. The display unit displays both reduced image data obtained from the image file and a predetermined information, if the image file has the authentication data, wherein the predetermined information indicates that the image file has the authentication data.

3 Claims, 11 Drawing Sheets

U.S. PATENT DOCUMENTS

| | | | |
|---|---|---|---|
| 2001/0021251 A1 | 9/2001 | Kasai | |
| 2002/0015510 A1* | 2/2002 | Akashi | 382/100 |
| 2002/0067923 A1* | 6/2002 | Fujimura | 396/429 |
| 2002/0129255 A1* | 9/2002 | Tsuchiyama et al. | 713/176 |
| 2003/0011684 A1* | 1/2003 | Narayanaswami et al. | 348/207.99 |
| 2003/0117513 A1* | 6/2003 | Anderson | 348/333.11 |
| 2004/0201751 A1* | 10/2004 | Bell et al. | 348/231.99 |
| 2008/0049971 A1* | 2/2008 | Ramos et al. | 382/100 |

FOREIGN PATENT DOCUMENTS

| | | |
|---|---|---|
| JP | 9-163281 A | 6/1997 |
| JP | 10-107788 | 4/1998 |
| JP | 11-308564 | 11/1999 |
| JP | 2000-209426 | 7/2000 |
| JP | 2001-086449 | 3/2001 |
| JP | 2001-186386 A | 7/2001 |
| JP | 2001-309159 | 11/2001 |
| WO | WO 00/64094 | 10/2000 |

OTHER PUBLICATIONS

Japanese Patent Office, Office Action dated Jun. 17, 2008, concerning basic Japanese Patent Application No. 2002-353827.

Japanese Office Action issued Sep. 16, 2008, concerning basic Japanese Patent Application No. 2002-353827.

* cited by examiner

FIG. 8

| HEADER | FILE NAME |
| | CAMERA ID |
| | THUMBNAIL IMAGE |
| | OTHER INFORMATION |
| BODY | IMAGE DATA |
| FOOTER | MARKER | AUTHENTICATION DATA (MAC DATA OR DIGITAL SIGNATURE DATA) |
| | ⋮ |

IMAGE SENSING APPARATUS AND METHOD OF CONTROLLING THE SAME

FIELD OF THE INVENTION

The present invention relates to an image sensing apparatus which notifies a user of information concerning an image file.

BACKGROUND OF THE INVENTION

Recent digital cameras can display, on a display device, information concerning image files in a removable memory.

Unfortunately, none of these recent digital cameras can notify a user whether each image file in the removable memory has authentication data. Therefore, even an image file having authentication data is erased by mistake. Note that authentication data is data necessary to a process of authenticating whether image data in an image file is altered.

Also, no recent digital cameras are designed by taking account of how to display, on a limited screen, information indicating whether an image file has authentication data.

SUMMARY OF THE INVENTION

The present invention has been made to solve the above problems, and has as its object to notify a user whether an image file has authentication data.

An image sensing apparatus of the present invention comprises determining unit adapted to determine whether an image file has authentication data, and display unit adapted to display, in a predetermined area, information indicating that the image file has authentication data, if the image file has authentication data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a view showing the file format of an image file having authentication data;

DETAILED DESCRIPTION OF THE PREFERRED EMBODIMENTS

First Embodiment

The first embodiment of the present invention will be described below with reference to FIGS. 1 to 4C.

Figure 1:
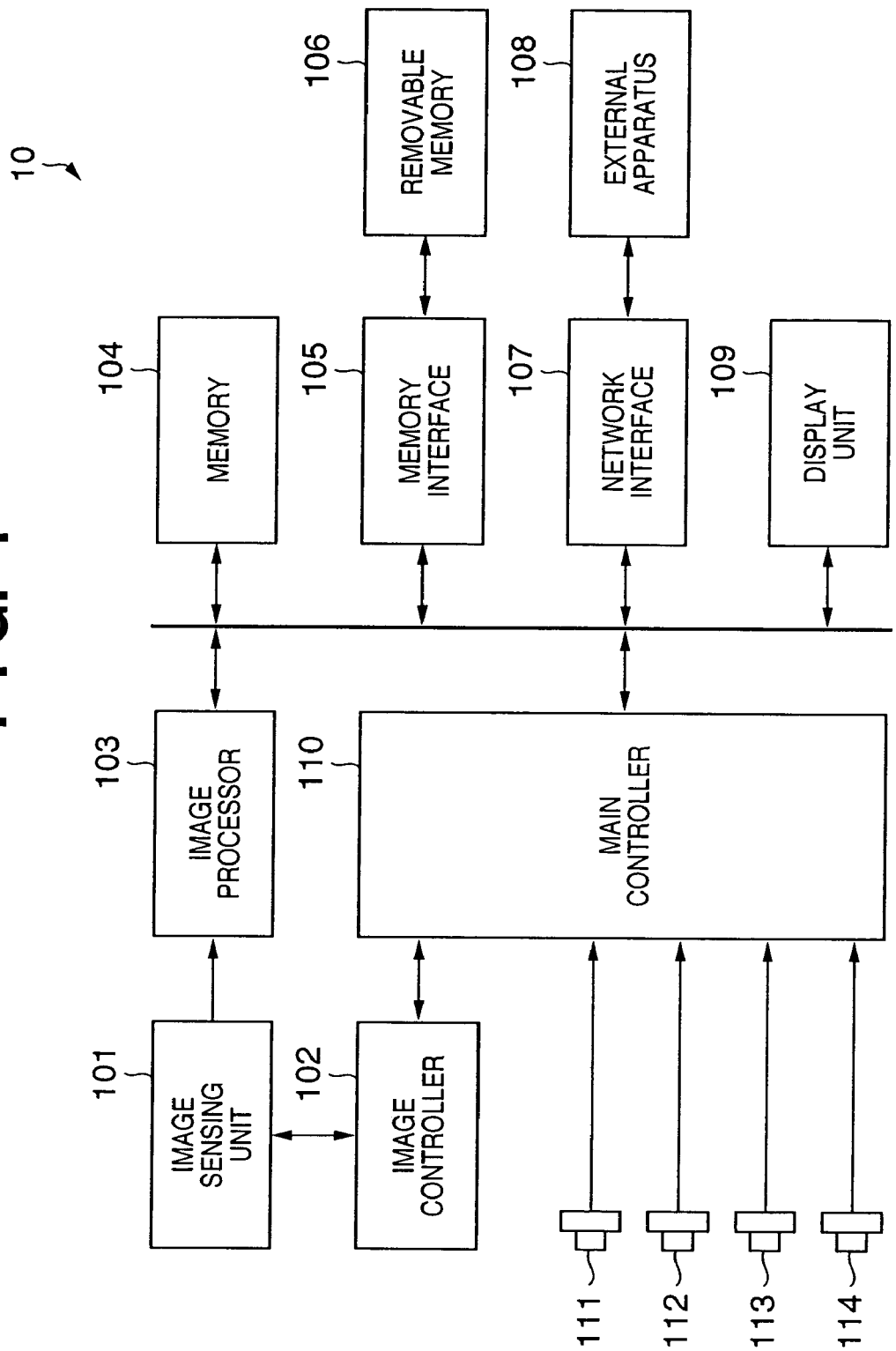
FIG. 1 is a block diagram showing the main components of an image sensing apparatus according to the first and second embodiments.

FIG. 1 is a block diagram showing the main components of an image sensing apparatus 10 according to this embodiment. The image sensing apparatus 10 is an apparatus (e.g., a digital camera, a scanner, a copying machine, or a portable information terminal with a digital camera) having a function of sensing an image by an image sensor. In the first embodiment, the image sensing apparatus 10 will be explained by taking a digital camera as an example in order to simplify the explanation.

Referring to FIG. 1, an image sensing unit 101 generates image data of an image sensed by an image sensor. An image sensing controller 102 is a unit for controlling the operation of the image sensing unit 101 in accordance with instructions from a main controller 110. The image sensing controller 102 controls focusing, aperture, and zoom. The image sensing controller 102 provides the main controller 110 with information pertaining to the image data generated by the image sensing unit 101. An image processor 103 adjusts the image quality of the image data obtained from the image sensing unit 101 in accordance with a plurality of preset image adjusting parameters, and compresses the adjusted image data in accordance with a predetermined image compressing scheme (e.g., JPEG coding). A memory 104 stores various data.

A memory interface 105 writes an image file designated by the main controller 110 in a removable memory 106, and reads out an image file designated by the main controller 110 from the removable memory 106. The removable memory 106 can store a plurality of image files.

A network interface 107 transmits an image file designated by the main controller 110 to an external apparatus 108. The external apparatus 108 is an apparatus in which an application program for remotely controlling the image sensing apparatus 10, an application program for adjusting the image quality of image data in accordance with a plurality of image adjusting parameters, and the like are installed. For example, the external apparatus 108 is a personal computer.

A display unit 109 displays reduced image data of an image sensed by the image sensing unit 101, reduced image data of an image file read out from the removable memory 106, and the like. The display unit 109 also displays information pertaining to a selected image.

The main controller 110 controls various functions of the image sensing apparatus 10. Also, the main controller 110 executes an authentication data generation process, image file generation process, image protecting process, and the like. The authentication data generation process is to generate authentication data of image data obtained from the image processor 103, by using the hash value of the image data and key data (equivalent to a secret key in a secret key cryptographic system or a private key in a public key cryptographic system). The authentication data is necessary for a process of authenticating whether image data is altered. The image file generation process is to generate an image file containing image data and its authentication data. The image protecting process is to add, to an image file, information for preventing erasure from the removable memory 106.

FIG. 8 shows an example of the file format of an image file stored in the removable memory 106. An image file is made up of a header, body, and footer. However, an image which is sensed while an alteration preventing function is nullified has no authentication data, or has no authentication data storage area in the footer. The header contains the file name, camera ID information for specifying a digital camera used in image sensing, and a thumbnail image. "Other information" includes information such as the image size (the numbers of pixels in the horizontal and vertical directions), the start position and size of the body, and the start position and size of the footer. The body stores compression-coded image data (e.g., JPEG encoded image data). "Marker" in the footer is information concerning the type of authentication data. If no authentication data is added to an image file, this image file has no marker. With this structure, it is possible by checking the footer to determine whether authentication data is added to the image file. Note that the marker and authentication data can also be stored in the header, instead of the footer.

An image switching dial 111 switches reduced image data to be displayed in a selection area of the display unit 109. A display button 112 switches image display modes of the image sensing apparatus 10. The image sensing apparatus 10 has two image display modes, i.e., a one-image display mode and nine-image display mode. In the one-image display mode, one reduced image data read out from the removable memory 106 is displayed, and information concerning image data corresponding to the reduced image data is displayed. In the nine-image display mode, nine reduced image data read out from the removable memory 106 are displayed in a matrix manner (3×3 in this embodiment, but any other matrix is of course also possible), and information concerning image data corresponding to reduced image data in the selection area is displayed.

Reference numeral 113 denotes a button for designating the start of image sensing; and 114, a button for switching addition/no addition (ON/OFF) of authentication data. The state information is stored in a predetermined area of the memory 104. For example, if the button 114 is switched to designate addition of authentication data, authentication data is added to image data obtained by image sensing after that, when the image data is stored in the removable memory 106. Accordingly, if the button 114 is switched to designate no addition of authentication data, i.e., if the button 114 is switched to OFF, image data is stored without adding any authentication data to it. Note that the apparatus further comprises buttons and cursor buttons for selecting a displayed image, in addition to the above buttons.

Figure 4B:
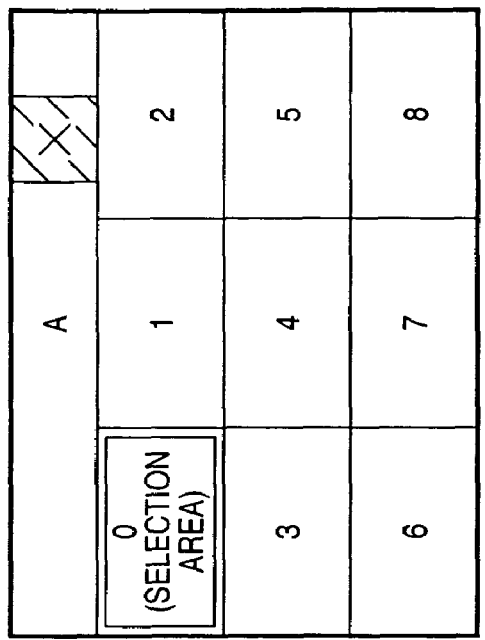
FIGS. 4A, 4B, and 4C are views showing an example of an image displayed in the one-image display mode, an example of an image displayed in the nine-image display mode, and an example of mark 1 displayed in area X, respectively.
Figure 4A:
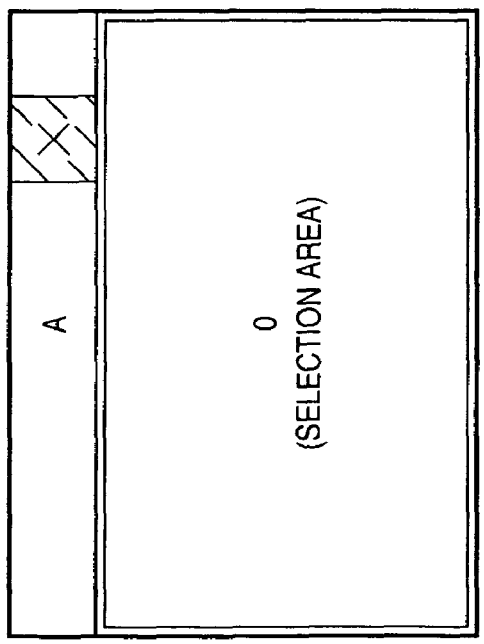
Figure 4C:
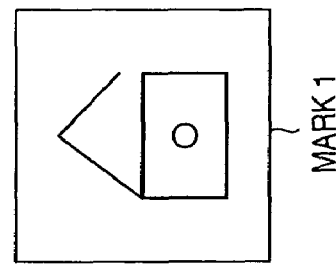

FIG. 4A is a view showing an example of an image displayed by the display unit 109 when the image display mode is the one-image display mode. Area 0 displays reduced image data read out from the removable memory 106. Area A displays information pertaining to image data corresponding to the reduced image data in area 0 as a selection area. Area X in area A displays mark 1 shown in FIG. 4C (mark 1 is displayed or not displayed in accordance with whether authentication data is added).

FIG. 4B is a view showing an example of an image displayed by the display unit 109 when the image display mode is the nine-image display mode. Areas 0 to 8 display reduced image data read out from the removable memory 106. Area A displays information pertaining to image data corresponding to reduced image data in a selection area (in the first embodiment, area 0). Area X in area A displays mark 1 shown in FIG. 4C. Mark 1 is displayed/not displayed in accordance with whether authentication data is added to a selected one of the nine images (slow forward/reverse, next nine images, and previous nine images can be selected by buttons (not shown) or key operations).

As described above, mark 1 shown in FIG. 4C is information for notifying a user that an image file corresponding to reduced image data in the selection area is an image file with authentication data. An "image file with authentication data" is an image file to which authentication data obtained from image data in the image file is added.

In the first embodiment, to realize a user-friendly user interface, areas A and X in FIG. 4A and areas A and X in FIG. 4B are displayed in the same positions. Also, to switch the image display mode from the one-image display mode (FIG. 4A) to the nine-image display mode (FIG. 4B), reduced image data in area 0 shown in FIG. 4A is displayed in the selection area shown in FIG. 4B. Similarly, to switch the image display mode from the nine-image display mode to the one-image display mode, reduced image data in the selection area shown in FIG. 4B is displayed in area 0 shown in FIG. 4A. With this arrangement, even when the image display mode is switched from the one-image display mode to the nine-image display mode or vice versa, the positions of areas A and X do not move, so information displayed in areas A and X remain unchanged. That is, the area for displaying mark 1 remains unchanged even when the image display modes are switched.

Figure 2:
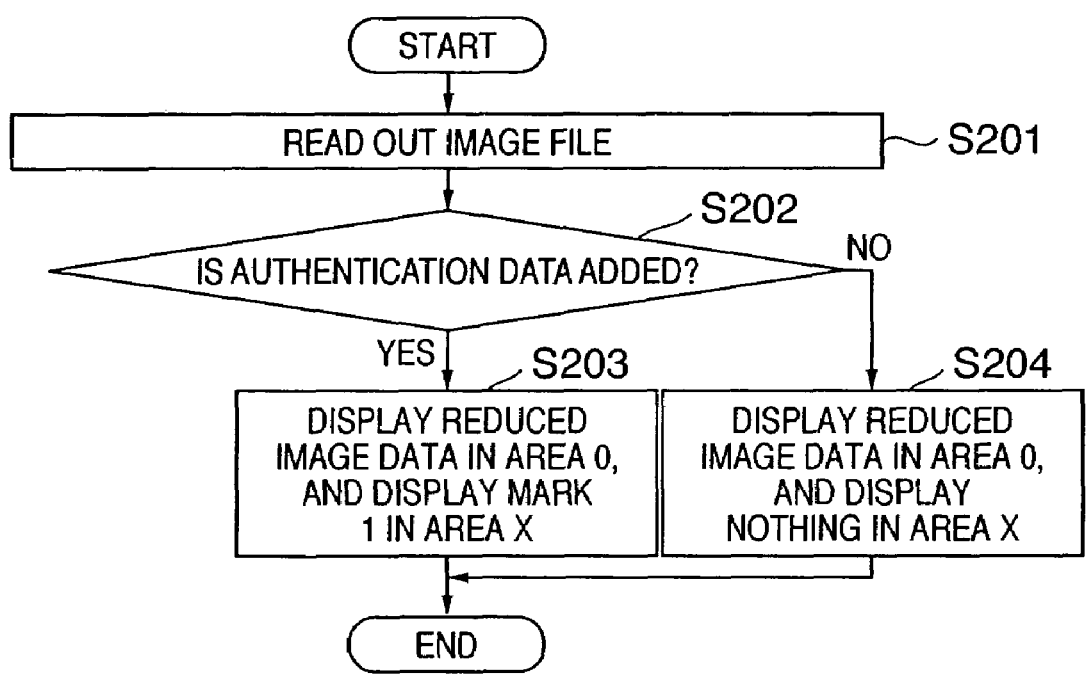
FIG. 2 is a flow chart showing a procedure in a one-image display mode.

FIG. 2 is a flow chart showing a processing sequence executed when the image display mode is switched from the nine-image display mode to the one-image display mode.

Step S201: The memory interface 105 reads out from the removable memory 106 an image file corresponding to reduced image data to be displayed in area 0 as the selection area, and writes the readout image file in the memory 104.

Step S202: The main controller 110 analyzes the image file written in the memory 104, and determines whether authentication data is added to the image file. If authentication data is added, the flow advances to step S203; if not, the flow advances to step S204.

Step S203: The main controller 110 reads out reduced image data from the image file written in the memory 104, and displays the readout reduced image data in area 0. Also, to notify the user that the image file corresponding to the reduced image data displayed in area 0 has authentication data, the main controller 110 displays mark 1 shown in FIG. 4C in area X shown in FIG. 4A.

Step S204: The main controller 110 reads out reduced image data from the image file written in the memory 104, and displays the readout reduced image data in area 0. Also, to notify the user that the image file corresponding to the reduced image data displayed in area 0 has no authentication data, the main controller 110 displays nothing in area X shown in FIG. 4A.

Figure 3:
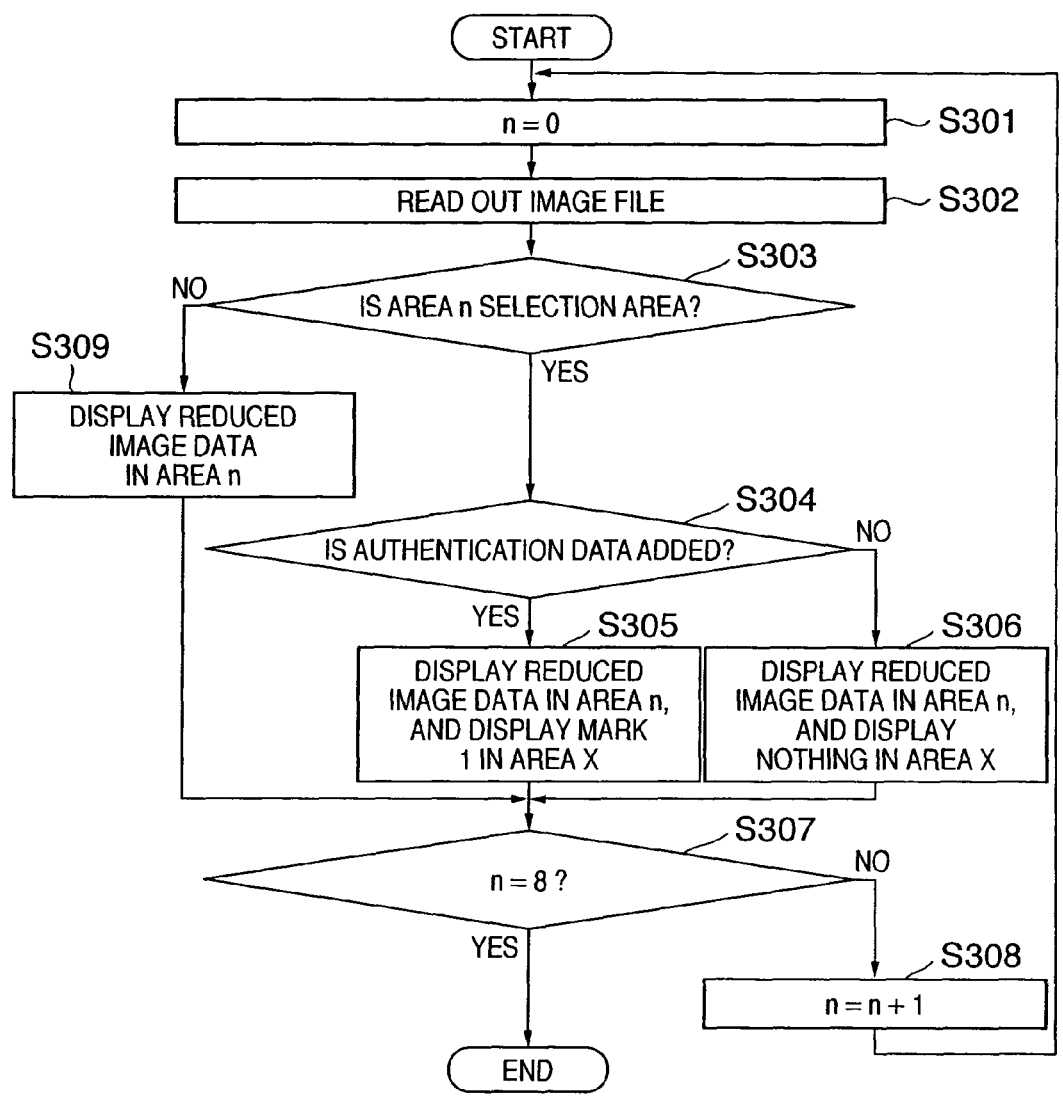
FIG. 3 is a flow chart showing a procedure in a nine-image display mode.

FIG. 3 is a flow chart showing a processing sequence executed when the image display mode is switched from the one-image display mode to the nine-image display mode.

Step S301: The main controller 110 sets n=0.

Step S302: The memory interface 105 reads out an image file corresponding to reduced image data to be displayed in area n from the removable memory 106, and writes the readout image file in the memory 104.

Step S303: The main controller 110 determines whether area n is the selection area. If area n is the selection area, the flow advances to step S304; if not, the flow advances to step S309.

Step S304: The main controller 110 analyzes the image file written in the memory 104, and determines whether authentication data is added to the image file. If authentication data is added, the flow advances to step S305; if not, the flow advances to step S306.

Step S305: The main controller 110 reads out reduced image data from the image file written in the memory 104, and displays the readout reduced image data in area n. Also, to notify the user that the image file corresponding to the reduced image data displayed in area n has authentication data, the main controller 110 displays mark 1 shown in FIG. 4C in area X shown in FIG. 4B.

Step S306: The main controller 110 reads out reduced image data from the image file written in the memory 104, and displays the readout reduced image data in area n. Also, to notify the user that the image file corresponding to the reduced image data displayed in area n has no authentication data, the main controller 110 displays nothing in area X shown in FIG. 4B.

As described above, the image sensing apparatus 10 according to the first embodiment can display mark 1 and hence can notify the user whether image file has authentication data.

Also, the image sensing apparatus 10 according to the first embodiment can display mark 1 in the same place (area X) even when the image display modes are switched. Therefore, the user can recognize only by checking area X whether an image file has authentication data.

Second Embodiment

The second embodiment of the present invention will be described below with reference to FIGS. 1 and 5 to 7E.

The second embodiment is an image sensing apparatus which determines whether an image file corresponding to selected reduced image data has authentication data, determines whether the image file is protected, and displays information (marks 2, 3, and 4) indicating the determination results in the same place (area X).

Figure 7A:
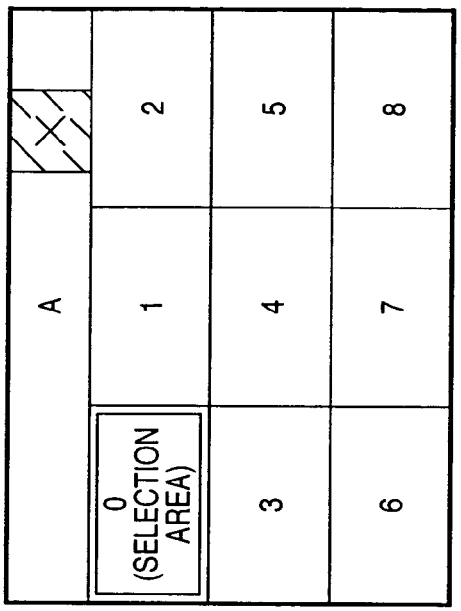
FIGS. 7A and 7B are views showing an example of an image displayed in the one-image display mode, and an example of an image displayed in the nine-image display mode, respectively.

FIG. 7A is a view showing an example of an image displayed by a display unit 109 when an image display mode is a one-image display mode. Area 0 displays reduced image data read out from a removable memory 106. Area A displays information concerning image data corresponding to reduced image data in a selection area (i.e., area 0). Area X in area A displays mark 2, 3, or 4 shown in FIG. 7C, 7D, or 7E, respectively.

Figure 7B:
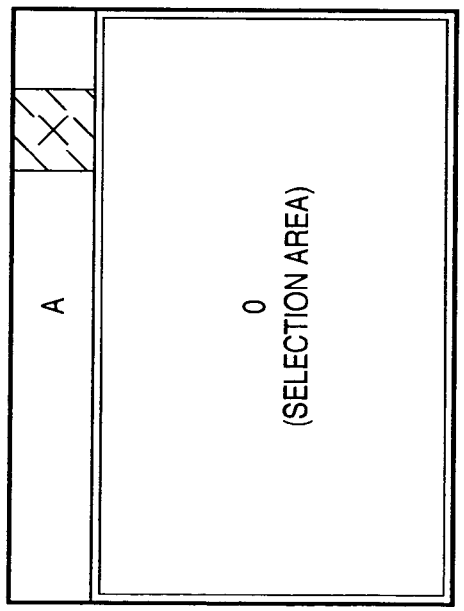

FIG. 7B is a view showing an example of an image displayed by the display unit 109 when the image display mode is a nine-image display mode. Areas 0 to 8 display reduced image data read out from the removable memory 106. Area A displays information concerning image data corresponding to reduced image data in a selection area (as in the first embodiment, area 0). Area X in area A displays mark 2, 3, or 4 shown in FIG. 7C, 7D, or 7E.

Figure 7C:
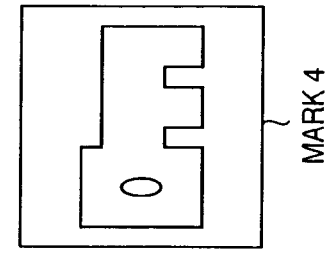
FIGS. 7C, 7D, and 7E are views showing examples of marks 2, 3, and 4, respectively, displayed in area X.
Figure 7D:
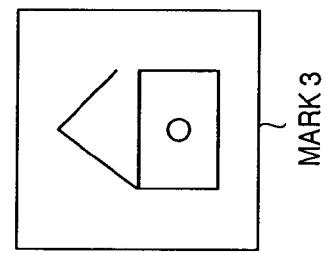
Figure 7E:
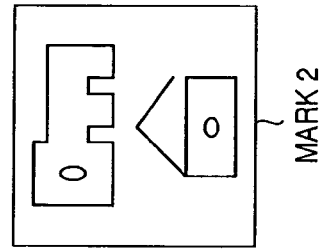

Mark 2 shown in FIG. 7C is information for notifying a user that an image file corresponding to reduced image data in the selection area has authentication data and is protected. Mark 3 shown in FIG. 7D is information for notifying a user that an image file corresponding to reduced image data in the selection area is protected but has no authentication data. Mark 4 shown in FIG. 7E is information for notifying a user that an image file corresponding to reduced image data in the selection area has authentication data but is not protected. A "protected image file" is an image file whose erasure from the removable memory 106 is prevented.

In the second embodiment, to realize a user-friendly user interface, areas A and X in FIG. 7A and areas A and X in FIG. 7B are displayed in the same positions. Also, to switch the image display mode from the one-image display mode to the nine-image display mode, reduced image data in area 0 shown in FIG. 7A is displayed in the selection area shown in FIG. 7B. Similarly, to switch the image display mode from the nine-image display mode to the one-image display mode, reduced image data in the selection area shown in FIG. 7B is displayed in area 0 shown in FIG. 7A. With this arrangement, even when the image display mode is switched from the one-image display mode to the nine-image display mode or vice versa, the positions of areas A and X do not move, so information displayed in areas A and X remain unchanged. That is, the area for displaying marks 2, 3, and 4 remains unchanged even when the image display modes are switched.

Figure 5:
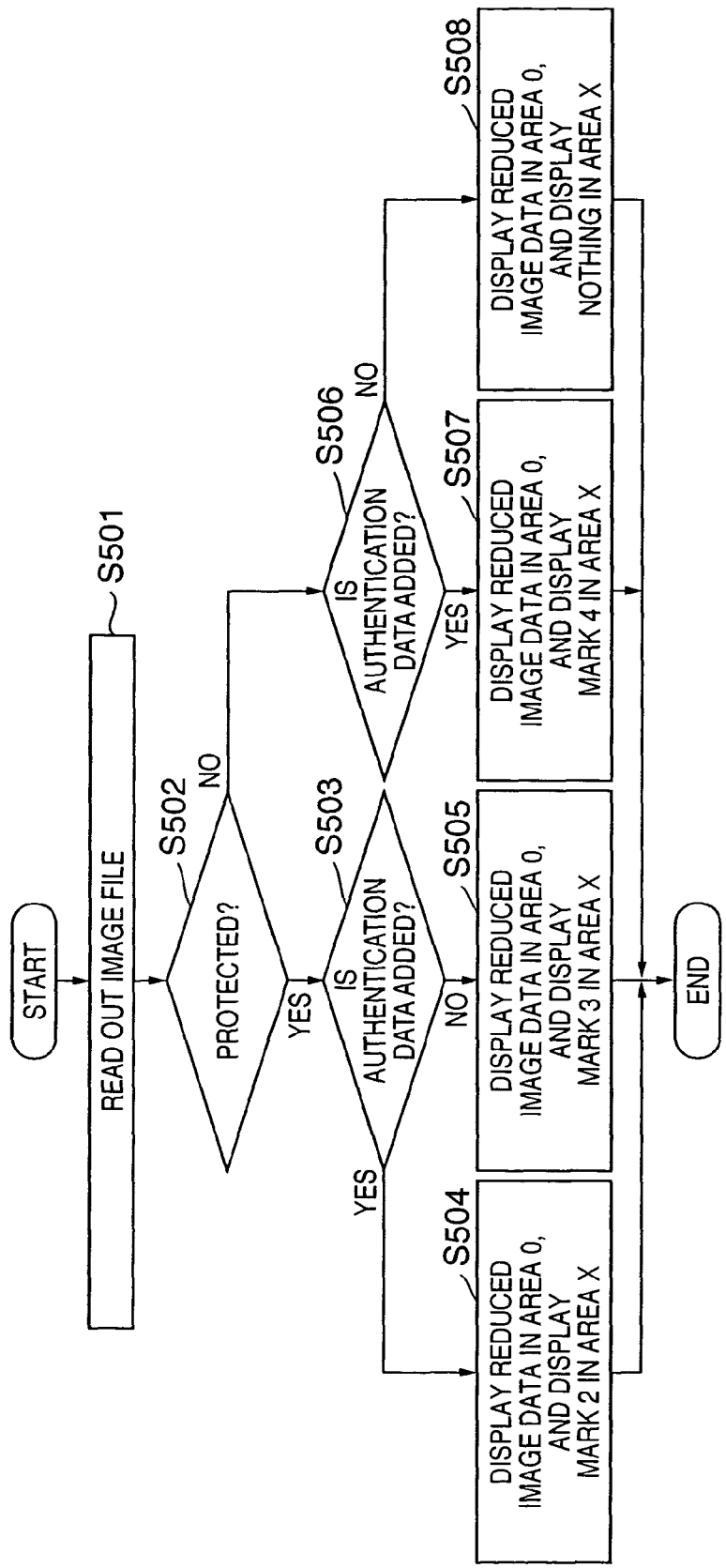
FIG. 5 is a flow chart showing a processing sequence in the one-image display mode.

FIG. 5 is a flow chart showing a processing sequence executed when the image display mode is switched from the nine-image display mode to the one-image display mode.

Step S501: The memory interface 105 reads out an image file corresponding to reduced image data to be displayed in area 0 as the selection area, and writes the readout image file in the memory 104.

Step S502: The main controller 110 analyzes the image file written in the memory 104, and determines whether the image file is protected. If the image file is protected, the flow advances to step S503; if not, the flow advances to step S506.

Step S503: The main controller 110 further analyzes the image file written in the memory 104, and determines whether authentication data is added to the image file. If authentication data is added, the flow advances to step S504; if not, the flow advances to step S505.

Step S504: The main controller 110 reads out reduced image data from the image file written in the memory 104, and displays the readout reduced image data in area 0. Also, to notify the user that the image file corresponding to the reduced image data displayed in area 0 is protected and has authentication data, the main controller 110 displays mark 2 shown in FIG. 7C in area X shown in FIG. 7A.

Step S505: The main controller 110 reads out reduced image data from the image file written in the memory 104, and displays the readout reduced image data in area 0. Also, to notify the user that the image file corresponding to the reduced image data displayed in area 0 is protected but has no authentication data, the main controller 110 displays mark 3 shown in FIG. 7D in area X shown in FIG. 7A.

Step S506: The main controller 110 further analyzes the image file written in the memory 104, and determines whether authentication data is added to the image file. If authentication data is added, the flow advances to step S507; if not, the flow advances to step S508.

Step S507: The main controller 110 reads out reduced image data from the image file written in the memory 104, and displays the readout reduced image data in area 0. Also, to notify the user that the image file corresponding to the reduced image data displayed in area 0 has authentication data but is not protected, the main controller 110 displays mark 4 shown in FIG. 7E in area X shown in FIG. 7A.

Step S508: The main controller 110 reads out reduced image data from the image file written in the memory 104, and displays the readout reduced image data in area 0. Also, to notify the user that the image file corresponding to the reduced image data displayed in area 0 has no authentication data and is not protected, the main controller 110 displays nothing in area X shown in FIG. 7A.

Figure 6:
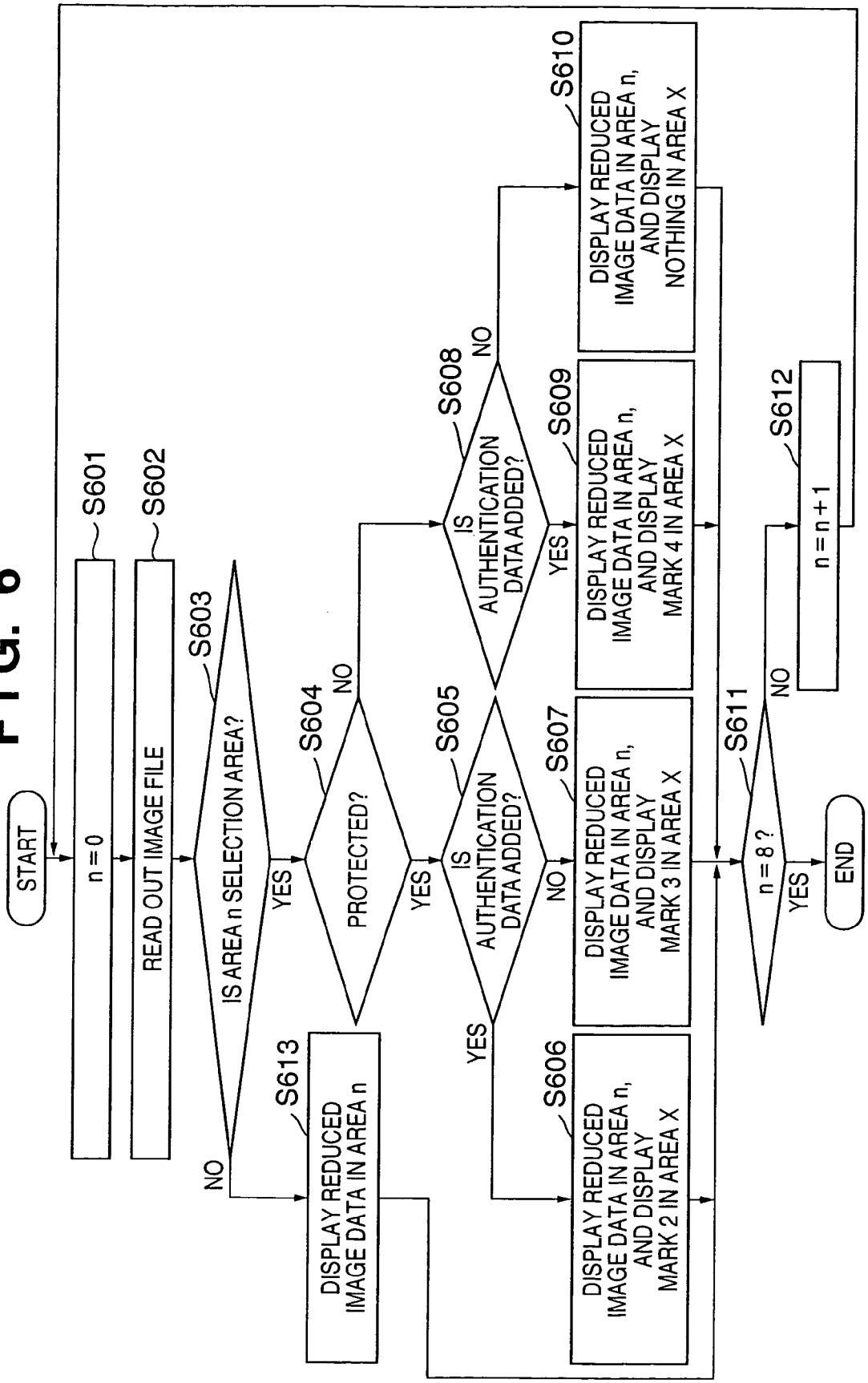
FIG. 6 is a flow chart showing a processing sequence in the nine-image display mode.

FIG. 6 is a flow chart showing a processing sequence executed when the image display mode is switched from the one-image display mode to the nine-image display mode.

Step S601: The main controller 110 sets n=0.

Step S602: The memory interface 105 reads out an image file corresponding to reduced image data to be displayed in area n from the removable memory 106, and writes the readout image file in the memory 104.

Step S603: The main controller 110 determines whether area n is the selection area. If area n is the selection area, the flow advances to step S604; if not, the flow advances to step S613.

Step S604: The main controller 110 analyzes the image file written in the memory 104, and determines whether the image file is protected. If the image file is protected, the flow advances to step S605; if not, the flow advances to step S608.

Step S605: The main controller 110 further analyzes the image file written in the memory 104, and determines whether authentication data is added to the image file. If authentication data is added, the flow advances to step S606; if not, the flow advances to step S607.

Step S606: The main controller 110 reads out reduced image data from the image file written in the memory 104, and displays the readout reduced image data in area n. Also, to notify the user that the image file corresponding to the reduced image data displayed in area n is protected and has authentication data, the main controller 110 displays mark 2 shown in FIG. 7C in area X shown in FIG. 7B.

Step S607: The main controller 110 reads out reduced image data from the image file written in the memory 104, and displays the readout reduced image data in area n. Also, to notify the user that the image file corresponding to the reduced image data displayed in area n is protected but has no authentication data, the main controller 110 displays mark 3 shown in FIG. 7D in area X shown in FIG. 7B.

Step S608: The main controller 110 further analyzes the image file written in the memory 104, and determines whether authentication data is added to the image file. If authentication data is added, the flow advances to step S609; if not, the flow advances to step S610.

Step S609: The main controller 110 reads out reduced image data from the image file written in the memory 104, and displays the readout reduced image data in area n. Also, to notify the user that the image file corresponding to the reduced image data displayed in area n has authentication data but is not protected, the main controller 110 displays mark 4 shown in FIG. 7E in area X shown in FIG. 7B.

Step S610: The main controller 110 reads out reduced image data from the image file written in the memory 104, and displays the readout reduced image data in area n. Also, to notify the user that the image file corresponding to the reduced image data displayed in area n has no authentication data and is not protected, the main controller 110 displays nothing in area X shown in FIG. 7B.

Step S611: The main controller 110 determines whether n=8. If n≠8, the flow advances to step S612.

Step S612: The main controller 110 sets n=n+1.

Step S613: The main controller 110 reads out reduced image data from the image file written in the memory 104, and displays the readout reduced image data in area n.

As described above, the image sensing apparatus 10 according to the second embodiment can display mark 2, 3, or 4 and hence can notify the user whether an image file has authentication data and is protected.

Also, the image sensing apparatus 10 according to the second embodiment can display mark 2, 3, or 4 in the same place (area X). Therefore, a limited display area can be effectively used.

Furthermore, the image sensing apparatus 10 according to the second embodiment can display mark 1, 2, or 3 in the same place (area X) even when the image display modes are switched. Therefore, the user can recognize only by checking area X whether an image file has authentication data and is protected.

In the first and second embodiments as described above, it is possible to notify a user whether an image file has authentication data.

Third Embodiment

The third embodiment of the present invention will be described below with reference to FIGS. 9 to 11.

Figure 9:
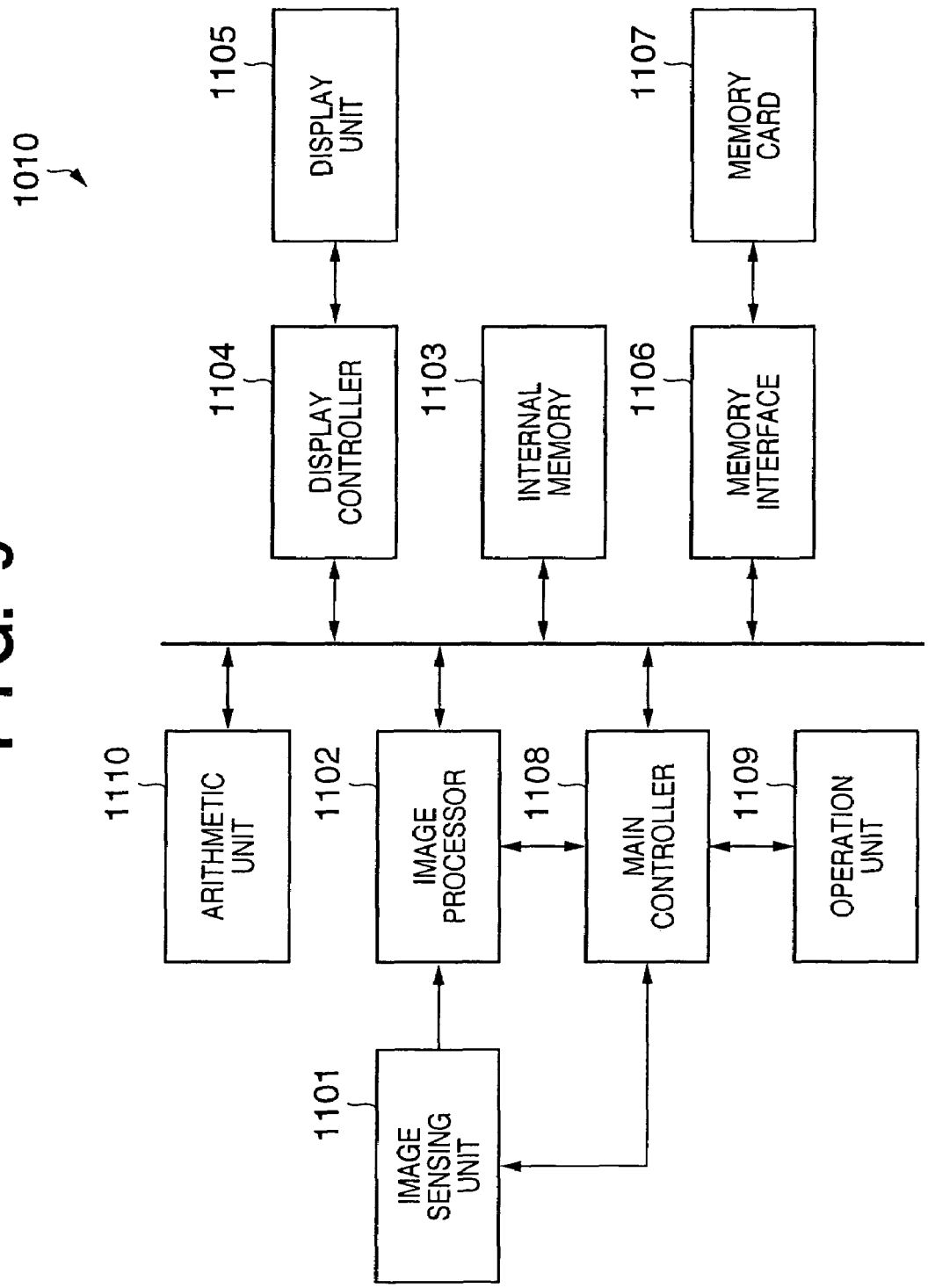
FIG. 9 is a block diagram showing the major components of an image sensing apparatus 1010 according to the third embodiment.

FIG. 9 is a block diagram showing the main constituent elements of an image sensing apparatus 1010 according to the third embodiment. The image sensing apparatus 1010 is an apparatus (e.g., a digital camera, a scanner, a copying machine, or a portable apparatus with a digital camera) having a function of sensing a digital image by using an image sensor. As in the first and second embodiments, the image sensing apparatus 1010 is a digital camera.

An image sensing unit 1101 senses a digital image by using an image sensor. An image processor 1102 converts the size of the digital image obtained from the image sensing unit 1101 into a predetermined size, and develops this digital image converted into the predetermined size. In this embodiment, "development" is to adjust at least one of the white balance, brightness, hue, saturation, color space, and the like of the digital image in accordance with preset image adjusting conditions.

When an image recording mode is a JPEG mode, the image processor 1102 converts the developed digital image into a JPEG image having predetermined image quality (fine or normal). In addition, the image processor 1102 generates a reduced image and thumbnail image from the developed digital image, and writes the JPEG image, reduced image, and thumbnail image in an internal memory 1103. In this embodiment, a digital image compressed in accordance with a lossy compression scheme such as a JPEG scheme (ISO/IEC 10918-1) will be called a JPEG image, and an image recording mode in which a digital image is saved as it is converted into a JPEG image will be called a JPEG mode. Also, in this embodiment, an image obtained by reducing a developed digital image to a size matching the screen size of a display unit 1105 will be called a reduced image.

When the image recording mode is a RAW mode, the image processor 1102 converts the developed digital image into a RAW image, generates a reduced image and thumbnail image from the developed digital image, and writes the RAW image, reduced image, and thumbnail image in the internal memory 1103. In this embodiment, a digital image compressed in accordance with a lossless compression scheme will be called a RAW image, and an image recording mode in which a digital image is converted into a RAW image will be called a RAW mode.

If an authentication data addition mode is ON, a display controller 1104 automatically displays the reduced image (obtained by reducing the sensed digital image) obtained from the internal memory 1103 on the display unit 1105, and also automatically displays an addition mark on the display unit 1105. If the authentication data addition mode is OFF, the display controller 1104 automatically displays the reduced image obtained from the internal memory 1103 on the display unit 1105, but displays no addition mark. In this embodiment, a mode in which authentication data is added to a sensed digital image will be called an authentication data addition mode, and information indicating that authentication data is added to a sensed digital image will be called an addition mark.

A memory interface 1106 saves an image file obtained from the internal memory 1103 in a memory card 1107. The memory card 1107 is a removable storage medium having a capacity for storing a plurality of image files.

A main controller 1108 controls various functions of the image sensing apparatus 1010. The main controller 1108 has a microcomputer and a memory storing programs executable by the microcomputer. An operation unit 1109 has operating means such as switches, buttons, and dials for operating the image sensing apparatus 1010. Switching between the image recording modes, ON/OFF of the authentication data addition mode, and the like can be set by using the operation unit 109. Also, the image adjusting conditions for adjusting at least one of the white balance, brightness, hue, saturation, color space, size, image quality, and the like of a sensed image can be set by using the operation unit 1109.

If the image recording mode is the JPEG mode, an arithmetic unit 1110 generates authentication data from a JPEG image obtained from the internal memory 1103. Authentication data of a JPEG image is generated by performing encryption (or an arithmetic operation equivalent to encryption) on a hash value (or data equivalent to a hash value) calculated from the JPEG image by using a secret key of a secret key cryptographic system (also called a symmetric key cryptographic system). However, authentication data can also be generated by some other methods. For example, it is of course possible to generate authentication data by performing encryption (or an arithmetic operation equivalent to encryption) on a hash value (or data equivalent to a hash value) calculated from a JPEG image by using a private key of a public key cryptographic system (also called an asymmetric key cryptographic system).

If the image recording mode is the RAW mode, the arithmetic unit 1110 generates authentication data from a RAW image obtained from the internal memory 1103. Authentication data of a RAW image is generated by performing encryption (or an arithmetic operation equivalent to encryption) on a hash value (or data equivalent to a hash value) calculated from the RAW image by using a secret key of a secret key cryptographic system (also called a symmetric key cryptographic system). However, authentication data can also be generated by some other methods. For example, it is of course possible to generate authentication data by performing encryption (or an arithmetic operation equivalent to encryption) on a hash value (or data equivalent to a hash value) calculated from a RAW image by using a private key of a public key cryptographic system (also called an asymmetric key cryptographic system). Note that the format of image data when the image data is stored in the memory card 1107 is the same as shown in FIG. 8.

Figure 10:
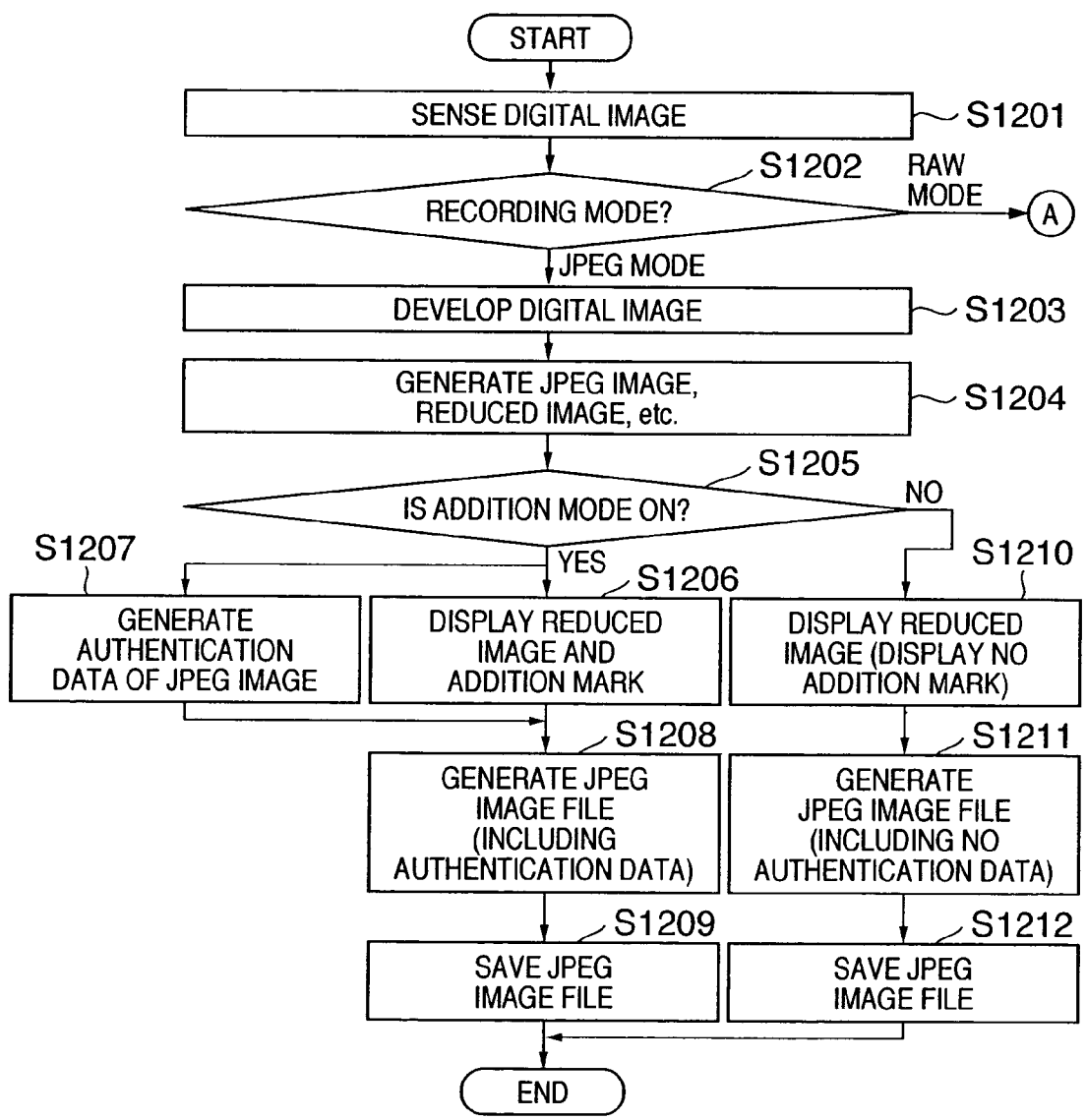
FIG. 10 is a flow chart showing part of a processing sequence performed by the image sensing apparatus 1010 according to the third embodiment.
Figure 11:
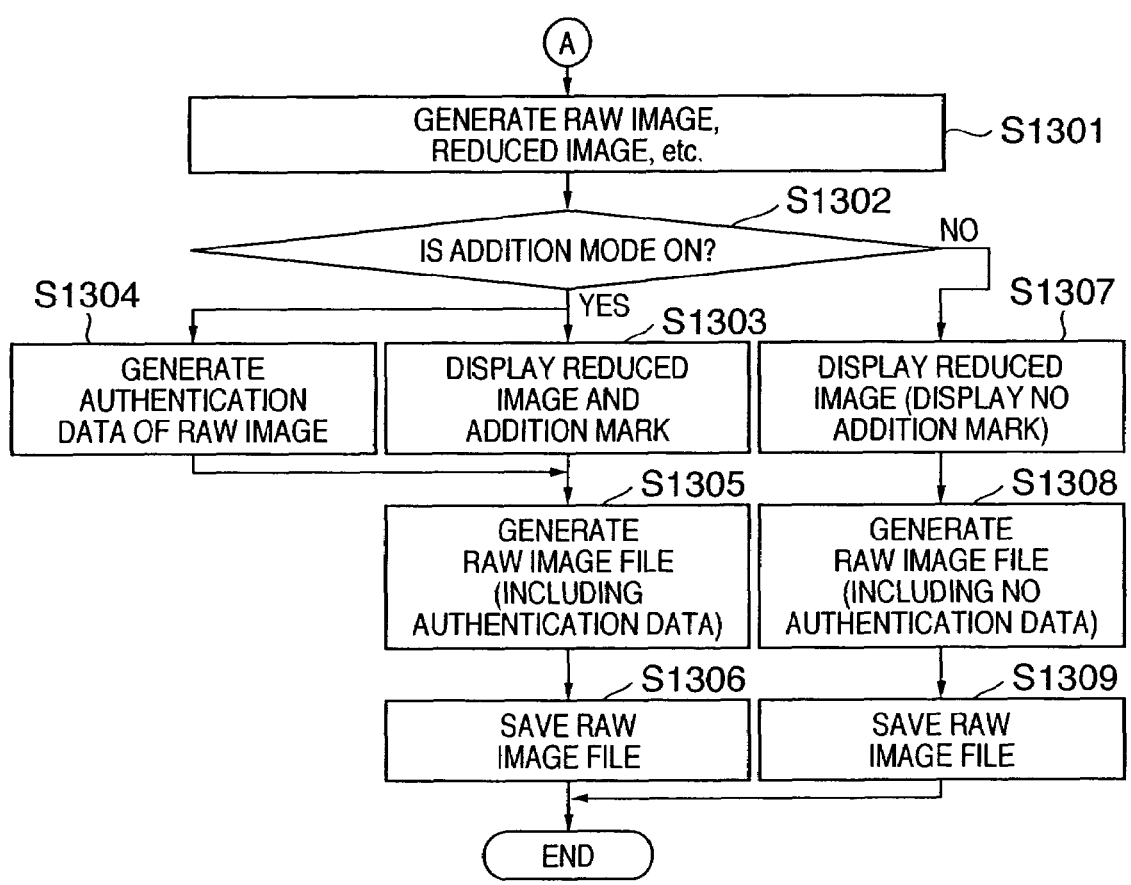
FIG. 11 is a flow chart showing part of the processing sequence performed by the image sensing apparatus 1010 according to the third embodiment.

FIGS. 10 and 11 are flow charts showing processing sequences performed by the image sensing apparatus 1010 according to the third embodiment.

Step S1201: A digital image is sensed in accordance with instructions from the user.

Step S1202: An image recording mode is determined. If the image recording mode is the JPEG mode, the flow advances to step S1203. If the image recording mode is the RAW mode, the flow advances to step S1301.

Step S1203: The image processor 1102 converts the size of the digital image obtained from the image sensing unit 1101 into a predetermined size, and develops this digital image converted into the predetermined size.

Step S1204: The image processor 1102 converts the developed digital image into a JPEG image having predetermined image quality (fine or normal). In addition, the image processor 1102 generates a reduced image and thumbnail image from the developed sensed image, and writes the JPEG image, reduced image, and thumbnail image in the internal memory 1103.

Step S1205: The main controller 1108 determines whether the authentication data addition mode is ON. If the authentication data addition mode is ON, the flow advances to steps S1206 and S1207; if not, the flow advances to step S1210.

Step S1206: Processing in step S1206 is executed in parallel with processing in step S1207, and is started before the processing in step S1207 is completed. The display controller 1104 automatically displays the reduced image obtained from the internal memory 1103 on the display unit 1105, and also automatically displays the addition mark (representing that authentication data is added to a sensed digital image) on the display unit 1105.

Step S1207: The arithmetic unit 1110 generates, from the JPEG image obtained from the internal memory 1103, authentication data (necessary to authenticate that the JPEG image is not altered) of the JPEG image, and writes the generated authentication data in the internal memory 1103.

Step S1208: The main controller 1108 generates a JPEG image file including the JPEG image, reduced image, thumbnail image, authentication data, and the like, and writes the generated JPEG image file in the internal memory 1103.

Step S1209: The memory interface 1106 saves the JPEG image file obtained from the internal memory 1103 in the memory card 1107.

Step S1210: The display controller 1104 automatically displays the reduced image obtained from the internal memory 1103 on the display unit 1105, but displays no addition mark (representing that authentication data is added to a sensed digital image) on the display unit 1105. Since no addition mark is displayed on the display unit 1105, the user can recognize that the sensed digital image has no authentication data.

Step S1211: The main controller 1108 generates a JPEG image file (including no authentication data) including the JPEG image, reduced image, thumbnail image, and the like, and writes the generated JPEG image file in the internal memory 1103.

Step S1212: The memory interface 1106 saves the JPEG image file obtained from the internal memory 1103 in the memory card 1107.

Step S1301: The image processor 1102 converts the digital image obtained from the image sensing unit 1101 into a RAW image. In addition, the image processor 1102 generates a reduced image and thumbnail image from the digital image obtained from the image sensing unit 1101, and writes the RAW image, reduced image, and thumbnail image in the internal memory 1103.

Step S1302: The main controller 1108 determines whether the authentication data addition mode is ON. If the authentication data addition mode is ON, the flow advances to steps S1303 and S1304; if not, the flow advances to step S1307.

Step S1303: Processing in step S1303 is executed in parallel with processing in step S1304, and is started before the processing in step S1304 is completed. The display controller 1104 automatically displays the reduced image obtained from the internal memory 1103 on the display unit 1105, and also automatically displays the addition mark (representing that authentication data is added to a sensed digital image) on the display unit 1105.

Step S1304: The arithmetic unit 1110 generates, from the RAW image obtained from the internal memory 1103, authentication data (necessary to authenticate that the RAW image is not altered) of the RAW image, and writes the generated authentication data in the internal memory 1103.

Step S1305: The main controller 1108 generates a RAW image file including the RAW image, reduced image, thumbnail image, authentication data, and the like, and writes the generated RAW image file in the internal memory 1103.

Step S1306: The memory interface 1106 saves the RAW image file obtained from the internal memory 1103 in the memory card 1107.

Step S1307: The display controller 1104 automatically displays the reduced image obtained from the internal memory 1103 on the display unit 1105, but displays no addition mark (representing that authentication data is added to a sensed digital image) on the display unit 1105. Since no addition mark is displayed on the display unit 1105, the user can recognize that the sensed digital image has no authentication data.

Step S1308: The main controller 1108 generates a RAW image file (including no authentication data) including the RAW image, reduced image, thumbnail image, and the like, and writes the generated RAW image file in the internal memory 1103.

Step S1309: The memory interface 1106 saves the RAW image file obtained from the internal memory 1103 in the memory card 1107.

In the image sensing apparatus 1010 according to this embodiment as described above, when a reduced image of a sensed digital image is displayed on the display unit 1105, information (addition mark) representing that authentication data is added to the digital image can be displayed on the display unit 1105. When a user checks the sensed digital image, this function allows the user to determine whether the sensed digital image has authentication data.

Also, in the image sensing apparatus 1010 according to this embodiment, the process of generating authentication data of a sensed digital image and the process of automatically displaying, on the display unit 1105, information representing that the sensed digital image has the authentication data can be performed in parallel. With this function, the image sensing apparatus can notify the user of the information representing that a sensed digital image has authentication data.

In the third embodiment as described above, when a user checks a sensed digital image, he or she can determine whether the sensed digital image has authentication data.

In the above third embodiment, if the authentication data addition mode is ON when an image is sensed, a reduced image and a mark indicating that authentication data is added to the sensed image are displayed. However, check by this mark may also be performed when an image sensed in the past is displayed for confirmation on the display unit 1105. That is, the third embodiment may also be a combination of the first and second embodiments described previously.

Other Embodiment

The present invention is not limited to the above embodiments, but can be practiced in various forms. For example, the present invention can be practiced in a form in which the JPEG scheme is replaced with another lossy compression scheme other than the JPEG scheme.

The object of the present invention can also be achieved by supplying a storage medium storing the program code of software for implementing the functions of the above embodiments to a system or apparatus, and reading out and executing the program code stored in the storage medium by a computer (or a CPU or MPU) of the system or apparatus.

In this case, the program code read out from the storage medium implements the functions of the present invention, and the program code itself and the storage medium storing this program code constitute the invention.

As this storage medium for supplying the program code, it is possible to use, e.g., a flexible disk, hard disk, optical disk, magnetooptical disk, CD-ROM, CD-R, magnetic tape, nonvolatile memory card, and ROM.

Furthermore, besides the functions of the above embodiments are implemented by executing the readout program code by the computer, the present invention includes a case where an OS (basic system or Operating System) or the like running on the computer performs part or the whole of actual processing in accordance with instructions by the program code and thereby implements the functions of the embodiments.

Furthermore, the present invention also includes a case where the program code read out from the storage medium is written in a memory of a function expansion board inserted into the computer or of a function expansion unit connected to the computer, and, in accordance with instructions by the program code, a CPU or the like of the function expansion board or function expansion unit performs part or the whole of actual processing and thereby implements the functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. An imaging apparatus comprising:
an image capture unit;
a generating unit that generates authentication data used to authenticate whether image data acquired by the image capture unit is altered;
an instruction unit that issues an image capture instruction;
a mode setting unit that sets an authentication data addition mode;
a recording unit that records the image data acquired by the image capture unit and the authentication data generated by the generating unit in a removable recording medium, wherein the recording unit records the image data acquired by the image capture unit together with the authentication data in the removable recording medium in accordance with the image capture instruction issued by the instruction unit, if the authentication data addition mode is set by the mode setting unit, and records the image data acquired by the image capture unit without the authentication data in the removable recording medium in accordance with the image capture instruction issued by the instruction unit, if the authentication data addition mode is not set;
a display unit; and
a control unit that determines whether the authentication data addition mode is set by the mode setting unit in response to the image capture instruction issued by the instruction unit and controls the display unit so as to display an image relating to the image data which the image capture unit acquired in accordance with the image capture instruction and an additional information indicating that the authentication data is recorded with the image data in response to the image capture instruction, if it is determined that the authentication data addition mode is set by the mode setting unit, and the control unit controlling the display unit so as to display an image relating to the image data which the image capture unit acquired in accordance with the image capture instruction but not to display the additional information in response to the image capture instruction, if it is determined that the authentication data addition mode is not set, wherein, if it is determined that the authentication data addition mode is set by the mode setting unit, until the image data captured by the image capture unit is recorded by the recording unit from the image capture instruction had been issued by the instruction unit, said control unit controls the display unit so as to display the image relating to the image data captured by the image capture unit and the additional information.

2. An apparatus according to claim 1 wherein, if it is determined that the authentication data addition mode is set by the mode setting unit, the control unit controls the generating unit so as to generate the authentication data during the display unit displays the image relating to the image data captured by the image capture unit in response to the instruction issued by the instruction unit, and controls, in response to the generation of the authentication data by the generating unit, the recording unit so as to record the image data acquired by the image capture and the generated authentication data in the removable recording medium.

3. An apparatus according to claim 1, further comprising:
a memory,
wherein the image capture unit acquires the image data in response to the image capture instruction and stores the image data in the memory,
wherein the control unit controls the display unit so as to display a reduced image of the image data stored in the memory and the additional information, if the authentication data addition mode is set by the mode setting unit, and
wherein the recording unit records the image data stored in the memory with the authentication data in the removable recording medium, if the authentication data addition mode is set by the mode setting unit.

* * * * *